US012448648B2

(12) United States Patent
Drmanac et al.

(10) Patent No.: US 12,448,648 B2
(45) Date of Patent: Oct. 21, 2025

(54) CONTROLLED STRAND-DISPLACEMENT FOR PAIRED END SEQUENCING

(71) Applicant: MGI Tech Co. Ltd., Shenzhen (CN)

(72) Inventors: Radoje Drmanac, Los Altos Hills, CA (US); Matthew J. Callow, San Jose, CA (US)

(73) Assignee: MGI Tech Co., Ltd., Shenzhen (CN)

( * ) Notice: Subject to any disclaimer, the term of this patent is extended or adjusted under 35 U.S.C. 154(b) by 1166 days.

(21) Appl. No.: 17/130,852

(22) Filed: Dec. 22, 2020

(65) Prior Publication Data

US 2021/0189483 A1    Jun. 24, 2021

Related U.S. Application Data

(60) Provisional application No. 62/952,713, filed on Dec. 23, 2019.

(51) Int. Cl.
  *C12Q 1/68* (2018.01)
  *C12Q 1/6874* (2018.01)
(52) U.S. Cl.
  CPC .................. *C12Q 1/6874* (2013.01)
(58) Field of Classification Search
  CPC .................................................. C12Q 1/6874
  See application file for complete search history.

(56) References Cited

U.S. PATENT DOCUMENTS

2021/0189483 A1*  6/2021  Drmanac ............. C12Q 1/6874

FOREIGN PATENT DOCUMENTS

| CN | 101663405 | 3/2010 | |
|---|---|---|---|
| EP | 2947156 | 11/2015 | |
| WO | WO-2008041002 A2 * | 4/2008 | ........... C12Q 1/6874 |
| WO | WO-2012134602 A2 * | 10/2012 | ........... C12Q 1/6869 |
| WO | WO-2016038381 A1 * | 3/2016 | ........... C12Q 1/6806 |
| WO | WO-2016156845 A1 * | 10/2016 | ............. C12N 15/10 |
| WO | WO-2016170182 A1 * | 10/2016 | ........... C12Q 1/6806 |
| WO | 2018208133 | 11/2018 | |
| WO | WO-2021178467 A1 * | 9/2021 | ........... C12Q 1/6806 |

OTHER PUBLICATIONS

Drmanac., 2020. CoolMPS™: Advanced massively parallel sequencing using antibodies specific to each natural nucleobase. BioRxiv, pp. 2020-02. (Year: 2020).*
Hahn et al., 2021. CoolMPS for robust sequencing of single-nuclear RNAs captured by droplet-based method. Nucleic Acids Research, 49(2), e11 pp. 1-12. (Year: 2021).*
Korfhage et al., 2017. Clonal rolling circle amplification for on-chip DNA cluster generation. Biology Methods and Protocols, 2(1) bpx007, pp. 1-10. (Year: 2017).*
Lage, 2003. Whole genome analysis of genetic alterations in small DNA samples using hyperbranched strand displacement amplification and array—CGH. Genome research, 13(2), pp. 294-307. (Year: 2003).*
Radstrom et al., 2008. Strategies for overcoming PCR inhibition. Cold Spring Harbor Protocols, Strategies for Overcoming PCR Inhibition, Chapter 12, in PCR Primer, 2nd edition (eds. Dieffenbach and Dveksler). Cold Spring Harbor Laboratory Press, Cold Spring Harbor, NY, USA, 2008, vol. 3 (3) pp. 1-11. (Year: 2008).*
Schrader et al., 2012. PCR inhibitors—occurrence, properties and removal. Journal of applied microbiology, 113(5), pp. 1014-1026. (Year: 2012).*
International Application No. PCT/CN2020/000311, International Search Report and Written Opinion mailed on Mar. 25, 2021, 9 pages.
International Application No. PCT/CN2020/000311, International Preliminary Report on Patentability mailed on Jul. 7, 2022, 7 pages.

* cited by examiner

*Primary Examiner* — Stephanie K Mummert
*Assistant Examiner* — Olayinka A Oyeyemi
(74) *Attorney, Agent, or Firm* — Robert M. Bedgood; Pillsbury Winthrop Shaw Pittman LLP

(57) ABSTRACT

This application relates to methods and compositions used for paired-end sequencing. The method comprises providing a DNA array comprising a surface immobilized with DNA concatemers. For each of the plurality of DNA concatemers on the array, the method comprises annealing first read primers to primer binding sites on the DNA concatemer, extending at least some of the first read primers to incorporate dNTPs or dNTP analogs, thereby producing first read strands. Each of the dNTPs or dNTP analogs being incorporated is identified to produce first reads, performing controlled MDA by extending at least some of the first read strands with a polymerase having strand-displacement activity to generate a plurality of partially hybridized second strands. Second read primers are then annealed to the single-stranded branches of the plurality of second strands to generate the second reads.

26 Claims, 5 Drawing Sheets

CONTROLLED STRAND-DISPLACEMENT FOR PAIRED END SEQUENCING

RELATED APPLICATION

This application claims priority to and the benefit of U.S. Provisional Application No. 62/952,713, filed on Dec. 23, 2019. Said provisional application is herein incorporated by reference for all purposes.

FIELD OF THE INVENTION

This invention relates to the fields of DNA sequencing, genomics, and molecular biology.

BACKGROUND

Paired-end sequencing allows sequencing both ends of a DNA fragment. It may be performed by sequencing a DNA template and its complementary strand. See U.S. Pat. No. 10,227,647. Paired-end sequencing produces twice the number of reads with the same time and effort in library preparation as single-end sequencing. Use of read pairs produced in paired-end sequencing allows accurate read alignment and detection of mutations (e.g., insertion-deletion variants) that would be difficult to detect by single-end sequencing.

BRIEF SUMMARY OF INVENTION

The paired-end sequencing methods disclosed herein use controlled production of strands complementary to the DNA template (the first strand) so that they remain associated with the DNA template. These complementary strands are referred to as second strands. The nucleotide sequence of the DNA template (e.g., a DNA concatemer) can be determined by generating first reads from the DNA template and second reads from the second strands. Also disclosed are methods used to synchronize the production of the second strands and maximize the number of second strands at suitable lengths for generating the second reads.

In some aspects, a method disclosed herein comprises extending first read primers hybridized on a plurality of single strand DNA concatemers immobilized on an array to generate first reads of the plurality of single strand DNA, wherein said extending produced first read strands; performing controlled multiple displacement amplification (MDA) by extending the first read strands or portions thereof with a polymerase having strand-displacement activity to generate a plurality of second strands, each comprising (i) a sequence that is hybridized to one of the plurality of DNA concatemers, and (ii) an unhybridized, single-stranded branch; and extending second read primers that are hybridized to single-stranded branches of the plurality of second strands to generate the second reads.

In some aspects, the method disclosed herein comprises providing a DNA array comprising a surface with at least 1,000, at least 10,000, at least $10^5$, at least $10^6$ or at least $10^7$ DNA concatemers immobilized thereon. The number of DNA concatemers may be in a range from 1,000 to $10^{13}$, from $10^4$ and $10^{12}$, from $10^4$ to $10^{10}$, or from $10^5$ to $10^8$. For each of a plurality of DNA concatemers on the array, annealing first read primers to primer binding sites on the DNA concatemer, extending at least some of the first read primers to incorporate dNTPs or dNTP analogs, thereby producing first read strands. Each of the dNTPs or dNTP analogs being incorporated is identified to produce first reads. The method further comprises performing controlled MDA by extending at least some of the first read strands with a polymerase having strand-displacement activity to generate a plurality of second strands, each second strand comprising a portion that is hybridized to the DNA concatemer, and an unhybridized, single-stranded branch. The method may further comprise annealing second read primers to the single-stranded branches of the plurality of second strands and extending second read primers to generate the second reads.

In some aspects, a method disclosed herein comprises extending first read primers hybridized to a plurality of single-stranded DNA concatemers immobilized on an array in the presence of excisable nucleotides to generate first reads of the plurality of single-stranded DNA concatemers, wherein said extending produces first read strands incorporating the exercisable nucleotides. The method may further comprise one or more of cleaving the first read strands at the position of the exercisable bases to produce fragments of first read strands having extendible 3' ends, performing controlled MDA by extending the fragments of the first read primers to generate a plurality of second strands, and wherein the controlled MDA resulted in a plurality of second strands, each comprising a sequence that is hybridized to one of the plurality of DNA concatemers, and an unhybridized, single-stranded branch; and extending second read primers that are hybridized to single-stranded branches of the plurality of second strands to generate the second reads.

Also provided is an array comprising a plurality of single-stranded DNA concatemers and a plurality of primers wherein each single-stranded concatemer comprises a plurality of monomers, wherein each monomer comprises an adaptor sequence and a DNA target sequence, wherein each primer comprises a primer sequence that is complementary to and hybridizes to an adaptor sequence of the DNA concatemer, wherein at least one primer comprises excisable nucleotides, and wherein the at least one primer can be cleaved to release the excisable nucleotides and produces two or more fragments having extendible 3' ends.

In another aspect, the array is a support comprising an array of discrete areas, wherein a plurality of the areas comprise a clonal cluster of single-stranded DNA concatemers, a plurality of primers having reversible 3' blocking groups, and a plurality of primers having extendible 3' ends. The single-stranded concatemer comprises a plurality of monomers, and each monomer comprises an adaptor sequence and a DNA target sequence. Each primer comprises a primer sequence that is complementary to and hybridizes to an adaptor sequence of the DNA template, and at least one adaptor is hybridized to one primer having a reversible 3' blocking group and one primer having an extendible 3' end, and the primer having a reversible 3' blocking group is upstream of the primer having an extendible 3' end.

Also provided in this disclosure is a kit comprising a plurality of sequencing primers, a non-displacement DNA polymerase, a mixture of reversibly terminated nucleotides for SBS, a strand-displacement DNA polymerase, and a mixture of dNTPs. The kit further comprises one or more of the following: i) a buffer that is free of magnesium ("magnesium-free buffer") and ii) an extension inhibitor (e.g., EDTA, excess salts including KCl and NaCl, ionic detergents such as sodium deocycholate, sarkosyl and SDS, ethanol and isopropanol). In some embodiments, the mixture of nucleotides may further comprise uracil. In some embodiments, the ratio of uracil to the thymidine in the mixture is in the range of 1:2 to 1:10, e.g., 1:3 to 1:8, or 1:4 to 1:5. In some embodiments, the kit may further comprise a mixture of primers that are blocked at 3' (i.e., 3' blocked primers) and primers that are not blocked. In some embodiments, the ratio of the blocked primer to the unblocked primer is in the range of 1:1 to 1:5, e.g., from 1:2 to 1:4.

DETAILED DESCRIPTION OF THE INVENTION

1. Overview

Figure 1:
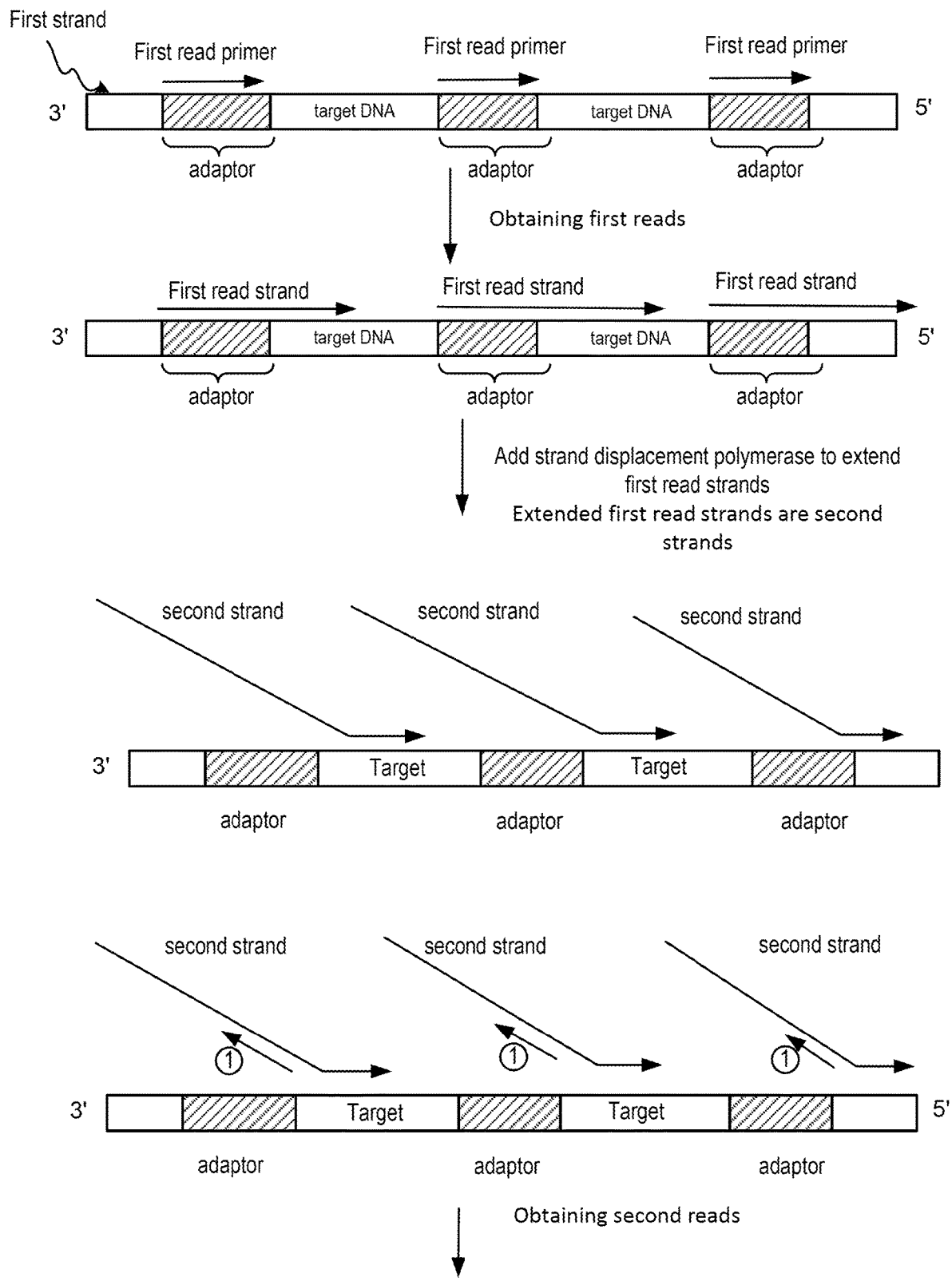
FIG. 1 illustrates an embodiment of the paired-end sequencing methods in this disclosure.

The present application relates to improved paired-end sequencing methods using DNA strands. In one approach, steps are taken to maximize the number of second strands with lengths optimized for sequencing, e.g., by including MDA primers. In some cases, primers are cleaved to produce multiple fragments, each serving as primers to make additional second strands. In some cases, steps are taken to optimize synchronous second strand production, for example, using extension-prevention conditions.

In some aspects of the disclosure, first reads of the paired-end sequencing are generated by extending first read primers hybridized to DNA concatemers immobilized on an array ("first read sequencing"). First read sequencing generates first read strands, which are complementary to the DNA concatemers. Controlled multiple displacement amplification (MDA) is then performed using extension primers and generates second strands. The extension primers can be additional MDA primers, the first read strands, or both. Each second strand comprises a sequence hybridized to one DNA concatemer and an unhybridized, single-stranded branch having one or more priming sequences complementary to second read primers. The first read strands may be further extended to produce second strands and become part of the second strands. Second reads are obtained by extending second read primers hybridized to the primer binding sequences on the second strands, a process referred to as "second read sequencing" in this disclosure.

In some approaches, the methods comprise various features that can increase the yield of second strands (i.e., the number of second strands that are suitable for second read sequencing) and efficiency of the second strand production. In some approaches, the paired-end sequencing methods disclosed herein use the excisable nucleotides, for example, uracils, which are incorporated during the extension of the first read primers. First read primers or first read strands containing these excisable nucleotides can be cleaved at the positions where these excisable nucleotides are present to generate multiple fragments that have extendible 3' ends, and these multiple fragments are then extended to generate more second strands.

In some approaches, the methods comprise features to synchronize the production of multiple second strands such that the produced second strands have similar length (e.g., a length suitable for second read sequencing). A variety of approaches are available to achieve such synchronization. In one embodiment, after the first read sequencing is completed, a high concentration of polymerase is introduced to bind to the primers (i.e., the MDA primers or the first read strands) hybridized to the DNA concatemers under extension-prevention conditions. This initial step under the extension-prevention conditions maximizes the binding of DNA polymerase to the DNA template and primers. The extension-prevention condition is then reversed to permit synchronous MDA from the primers. In some approaches, after carrying out the MDA for a first period of time, excess DNA polymerase molecules (i.e., the polymerase molecules are free in the reaction and are not bound to the primers and DNA templates) are removed, and MDA continues in the absence of the unbound DNA polymerase molecules. This process minimizes the interaction between the free polymerase molecules and newly formed second strands and the interaction between the free polymerase molecules and the DNA template beyond the initial binding period, facilitating synchronous extension and generation of the second strands.

Figures in this application illustrate certain embodiments of the invention. FIG. 1 shows a DNA concatemer comprising multiple monomers, each comprising an adaptor sequence and a target DNA sequence. First read primers are annealed to the primer binding sequence in the adaptors of the DNA concatemer and extended to generate first reads by sequencing by synthesis (SBS). Extending the first read primers produces first read strands. After the final cycle of SBS, the 3' blocking groups of the terminal nucleotides in the first read strands are removed and a strand displacement polymerase is added. The first read strands are extended by the strand displacement polymerase to generate second strands in MDA. The MDA is controlled such that the second strands are partially hybridized to the DNA concatemer, and each second strand comprises an unhybridized branch. Second read primers are then annealed to the branches (e.g., by hybridizing to the second read primer binding sequences on the adaptor sequences on the branches). These second read primers are then extended to generate second reads.

Figure 2:
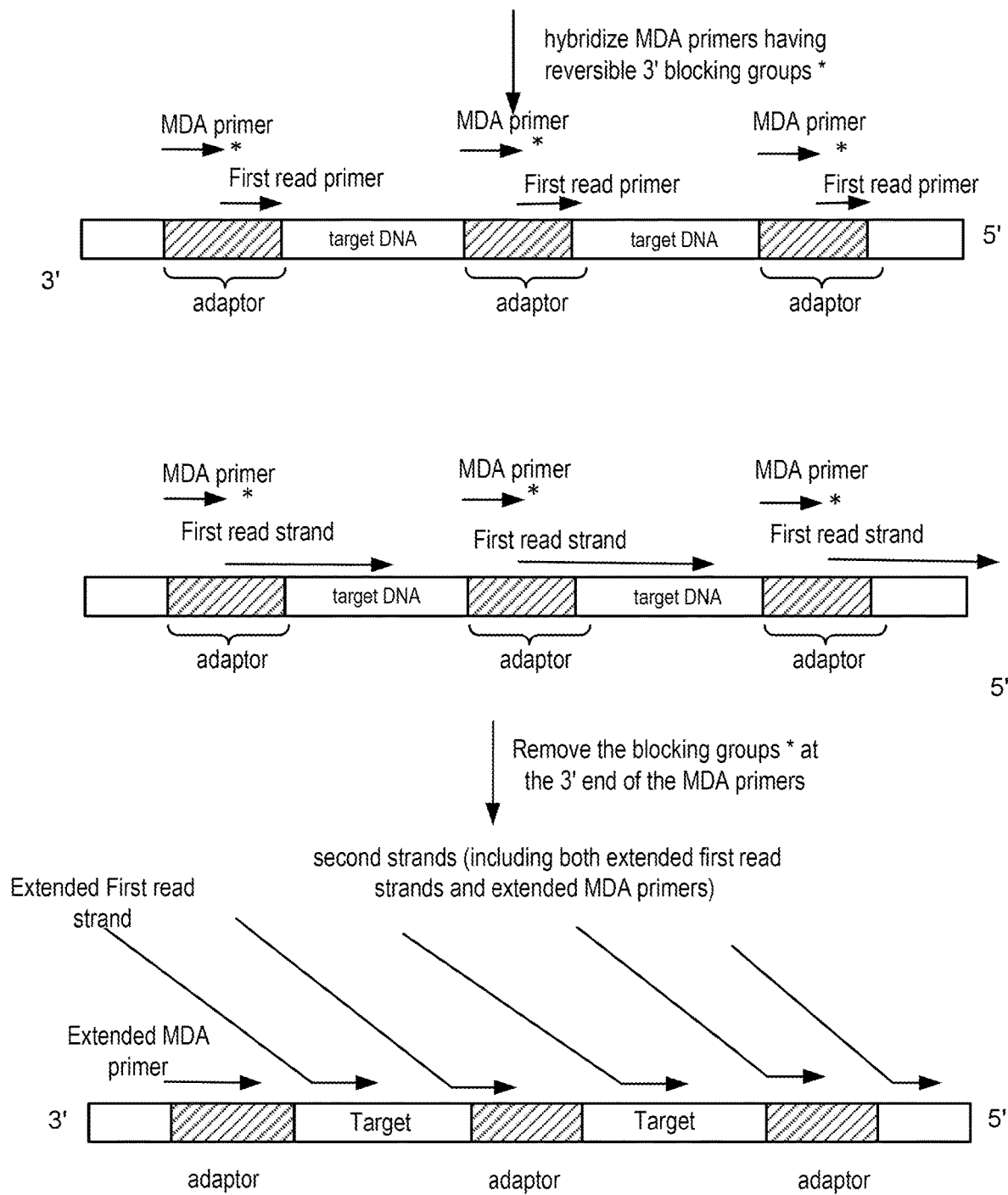
FIG. 2 illustrates an embodiment of a method of the disclosure, in which multiple displacement amplification (MDA) primers having reversible blocking groups (indicated in this figure by "*") are hybridized on the DNA concatemer upstream of the first read primers. After removal of the reversible blocking groups, both the MDA primers and the first read strands are extended in MDA to produce multiple second strands.

FIG. 2 shows that MDA primers having 3' blocking groups and first read primers are hybridized to the DNA concatemer. The blocking groups on these MDA primers are different from the blocking groups on the nucleotides being incorporated during the SBS. Unlike the blocking groups on the nucleotides, which are removed during each cycle of the SBS, the blocking groups on the MDA primers are retained throughout the entire SBS sequencing process. The first read primers are extended to generate the first reads and produce first read strands. After the first read sequencing is completed, the blocking groups on the MDA primers are removed, and the blocking groups of the last nucleotide added at the last sequencing cycles are also removed. Both the MDA primers and the first read strands are extended in the presence of a strand displacement DNA polymerase in controlled MDA reaction to produce second strands that are partially hybridized to the DNA concatemers. Second reads can be generated in the same manner as described above.

Figure 3:
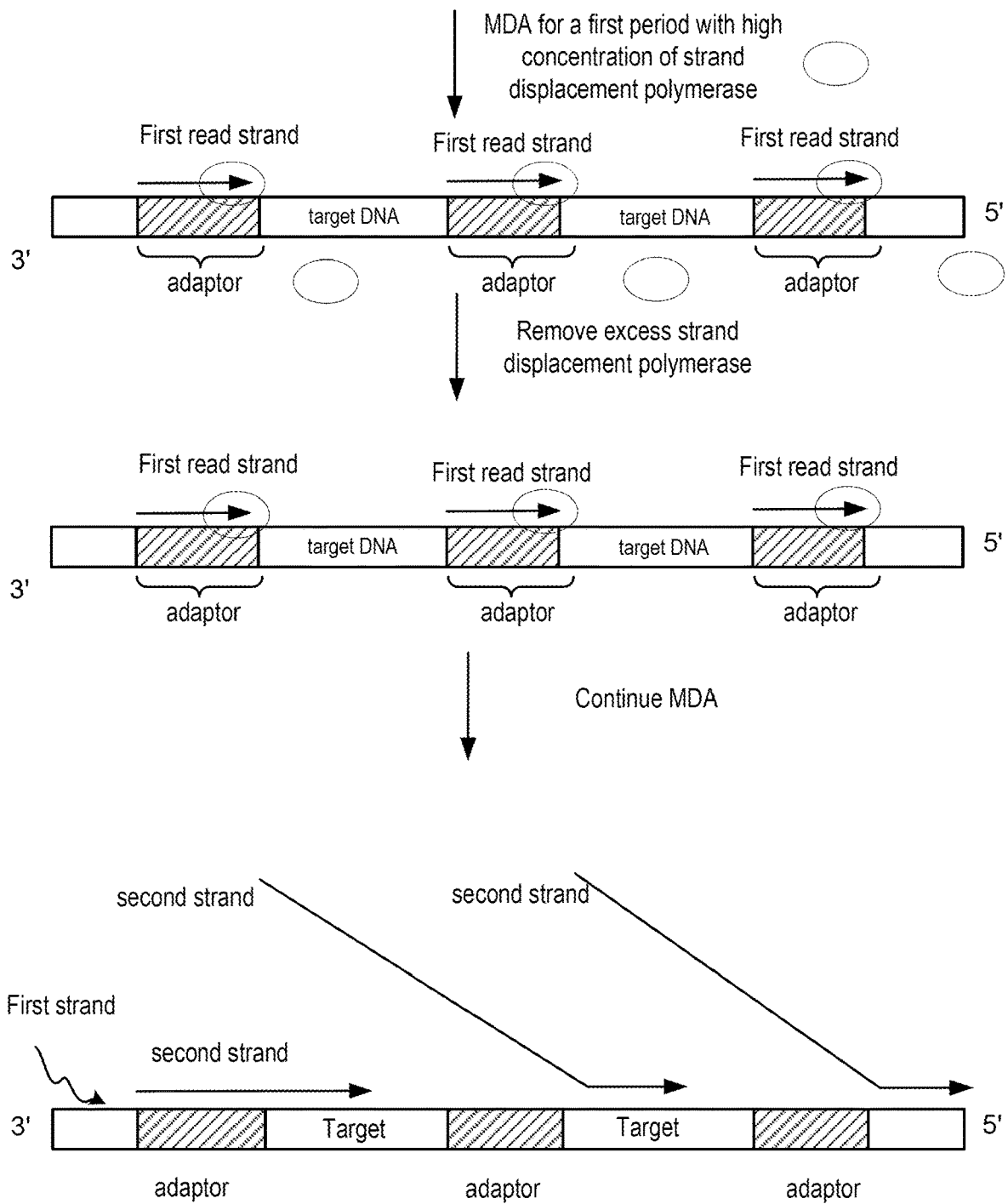
FIG. 3 illustrates an embodiment of a method of the disclosure. After the first read strands are generated during the first read sequencing, a strand-displacement DNA polymerase is bound to the DNA concatemers and initiates the MDA. The DNA polymerase is introduced to the reaction in a high concentration such that excess DNA polymerase molecules in the reaction are not bound to the DNA concatemers and the first reads strands. After the initiation, but before completion of the MDA, unbound DNA polymerase molecules are removed, and the MDA continues the production of second strands.

FIG. 3 shows after the first read sequencing is completed, the first read strands formed by the first read sequencing remain hybridized to the DNA concatemer. A high concentration of DNA polymerase is added to the array to extend the first read strands for an initial period. Due to the excess amount of DNA polymerase molecules in the reaction, some, but not all, of the DNA polymerase molecules bind to the concatemer, and the rest of the DNA polymerase molecules are free, i.e., not bound to the DNA concatemer and do not participate in the extension reaction. The array is then washed to remove the excess amount of DNA polymerase molecules. Buffers with nucleotides (but not DNA polymerase) are added to the reaction to allow the MDA to continue to produce second strands that are partially hybridized to the DNA concatemer.

Figure 4:
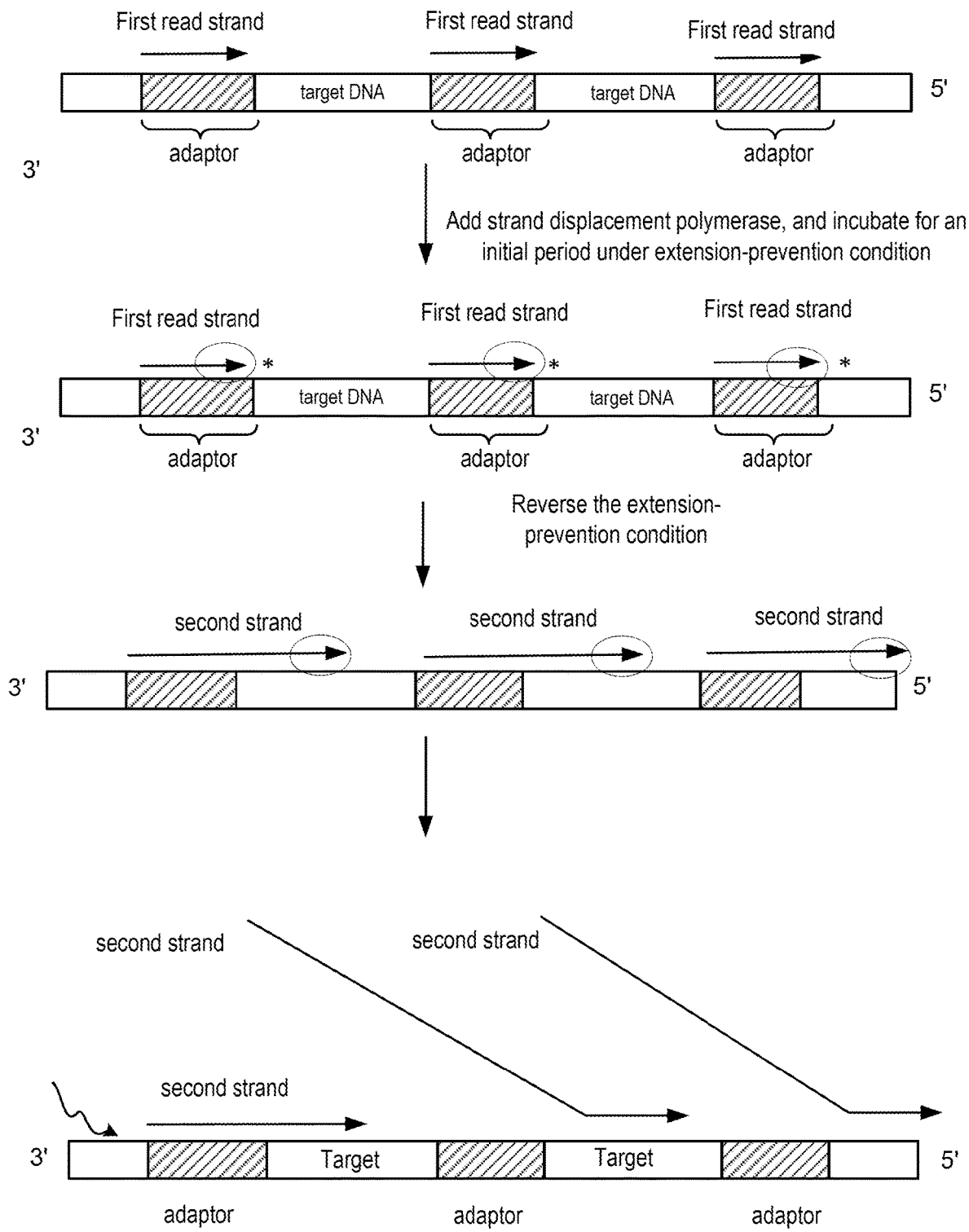
FIG. 4 shows an embodiment of a method of the disclosure. After first read strands are formed from first read sequencing, a strand-displacement DNA polymerase is added to the reaction under extension-prevention conditions. The polymerase binds to the concatemers and the first read strands but does not extend the primers under these conditions. The asterisk (*) in this figure indicates the primers cannot be extended due to the extension-prevention conditions.

FIG. 4 shows after the first read sequencing is completed, the first read strands formed by the first read sequencing remain hybridized to the DNA concatemer. A strand-displacement DNA polymerase is added to the reaction under extension—prevention conditions, e.g., the strand displacement DNA polymerase is in a buffer lacking at least one component required for extension, e.g., magnesium. Under these conditions, the strand-displacement DNA polymerase binds to the DNA concatemer but does not extend. After the array is maintained under these conditions for an initial period, these conditions are reversed to permit extension, e.g., adding the omitted component, (e.g., magnesium) back to the reaction at a concentration that is suitable for MDA. The MDA is then initiated to produce second strands.

Figure 5:
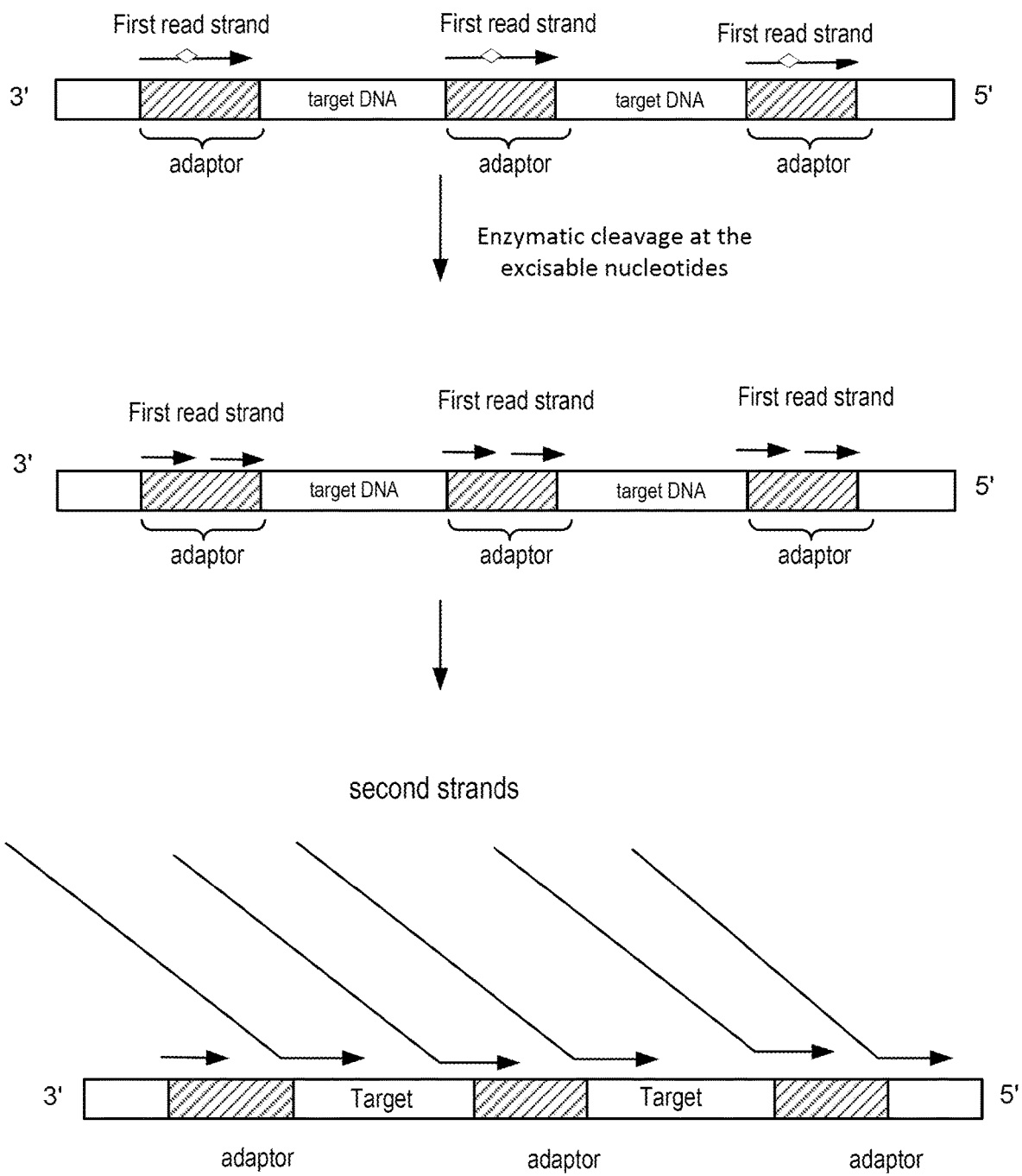
FIG. 5 shows an embodiment of a method of the disclosure, in which excisable nucleotides are incorporated in the first read strands during the first read sequencing. The first read strands are then cleaved at the positions where these excisable nucleotides are present to generate fragments having extendible 3' ends. These fragments are used as extension primers in the MDA to generate second strands.

FIG. 5 shows that the first read sequencing process produces first read strands that contain exercisable nucleotides (e.g., uracils). These first read strands are cleaved by an enzyme that recognizes the exercisable nucleotides, and such cleavage results in multiple fragments having extendible 3' ends and the release of the exercisable nucleotides. These fragments are extended in MDA to form multiple second strands.

The disclosure of U.S. Pat. No. 10,227,647 is incorporated by reference in its entirety for all purposes.

2. Definitions

As used here, a "primer" means an oligonucleotide, which is capable, upon forming a duplex with a polynucleotide template, of acting as a point of initiation of nucleic acid synthesis and being extended from its 3' end along the template so that an extended duplex is formed. A primer may comprise a natural sequence or a synthetic sequence. A primer may also comprise unnatural nucleotides. The sequence of nucleotides added during the extension process are determined by the sequence of the template polynucleotide. Primers are typically extended by a DNA polymerase.

As used herein, "random primer" refers to a primer having random nucleotide sequence.

As used herein, MDA or multiple displacement amplification, refers to a DNA amplification based on strand-displacement replication by multiple primers.

As used herein, a "polynucleotide" is used interchangeably with the term "nucleic acid" to mean DNA, RNA, and hybrid and synthetic nucleic acids and may be single-stranded or double-stranded. "Oligonucleotides" are short polynucleotides of between about 6 and about 300 nucleotides in length. "Complementary polynucleotide" refers to a polynucleotide complementary to a target nucleic acid.

As used herein, the term "strand-displacement activity" describes the ability to displace downstream DNA encountered during synthesis. Strand-displacement activity is described in US Pat. Pub. No. 20120115145, incorporated herein by reference, as follows: "Strand-displacement activity" designates the phenomenon by which a biological, chemical or physical agent, for example a DNA polymerase, causes the dissociation of a paired nucleic acid from its complementary strand in a direction from 5 towards 3, in conjunction with, and close to, the template-dependent nucleic acid synthesis. The strand-displacement starts at the 5' end of a paired nucleic acid sequence and the enzyme therefore carries out the nucleic acid synthesis immediately in 5' of the displacement site. The neosynthesized nucleic acid and the displaced nucleic acid generally have the same nucleotide sequence, which is complementary to the template nucleic acid strand. The strand-displacement activity may be situated on the same molecule as that conferring the activity of nucleic acid synthesis, and particularly the DNA synthesis, or it may be a separate and independent activity. DNA polymerases such as *E. coli* DNA polymerase I, Klenow fragment of DNA polymerase I, T7 or T5 bacteriophage DNA polymerase, and HIV virus reverse transcriptase are enzymes that possess both the polymerase activity and the strand-displacement activity. Agents such as helicases can be used in conjunction with inducing agents which do not possess strand-displacement activity in order to produce the strand-displacement effect, that is to say the displacement of a nucleic acid coupled to the synthesis of a nucleic acid of the same sequence. Likewise, proteins such as RecA or Single Strand Binding Protein from *E. coli* or another organism could be used to produce or to promote the strand-displacement, in conjunction with other inducing agents (Kornberg and Baker, 1992, DNA Replication, 2nd Edition, pp 113-225, Freeman, N.Y.). In one approach, the polymerase is Phi29 polymerase, which has a strong displacement activity at moderate temperatures (e.g., 20-37° C.). In one approach, Bst DNA polymerase, large fragment (e.g., NEB #MO275, available from New England Biolabs, Ipswich, MA) is used. Bst DNA Polymerase is active at elevated temperatures (~65° C.).

The term "first strand" refers to the single strand DNA template used in the paired-end sequencing.

The term "second strand" refers to a single DNA strand that is complementary to the first strand.

The term "MDA primers" refers to extension primers that hybridize to the DNA template and are extended to generate second strands in the displacement-extension reactions. The MDA primers disclosed in this application are not sequencing primers (e.g., first read primer). In some embodiments, the MDA primers and the first read primers have different sequences.

The term "first read primer" refers to a primer that hybridizes to the DNA template and used to generate the first reads for the paired-end sequencing.

The term "first read" refers to the nucleotide sequence information obtained by sequencing the DNA template using the first read primer.

The term "first read sequencing" refers to the sequencing process that is used to obtain the first read.

The term "first read strand" refers to the single strand polynucleotide produced by the first read sequencing, i.e. by extending the first read primer. The first read strand is also referred to as extended first read primer. The first read strand can be further extended to form second strands.

The term "second read primer" refers to the primer that hybridizes to the second strand, i.e., strands that are complementary to the DNA template. In some approaches, the second strand primers are hybridized to second strands that are partially hybridized to the DNA template.

The term "second read" refers to the nucleotide sequence information obtained by sequencing the second strands.

The term "second read sequencing" refers to the sequencing process that is used to obtain the second read.

The term "second read strand" refers to the single strand polynucleotide produced by the second read sequencing, i.e., by extending the second read primer.

The term "exercisable nucleotide" refers to a nucleotide in a DNA strand that can be removed and said removal results in the DNA strand being broken into two DNA fragments. One exemplary methods of removing the nucleotide from the DNA strand is through an enzyme. One exemplary excisable nucleotide is uracil.

The terms "reversible blocking group," of a reversible terminator nucleotide may also be referred to as a "removable blocking group," a "blocking moiety," a "blocking group," "reversible terminator blocking group" and the like. A reversible blocking group is a chemical moiety attached to the nucleotide sugar (e.g., deoxyribose), usually at the 3'-OH position of the sugar moiety, which prevents the addition of a nucleotide by a polymerase at that position. A reversible blocking group can be cleaved by an enzyme (e.g., a phosphatase or esterase), chemical reaction, heat, light, etc., to provide a hydroxyl group at the 3'-OH position of the nucleoside or nucleotide such that addition of a nucleotide by a polymerase may occur.

As used herein, a "dNTP" includes both naturally occurring deoxyribonucleotide triphosphates and analogs thereof, including analogs with a 3'-O cleavable blocking group.

The terms "solid support" and "support" are used interchangeably and refer to a material or group of materials having a rigid or semi-rigid surface or surfaces. Microarrays usually comprise at least one planar solid phase support, such as a glass microscope slide.

As used herein, the term "synchronized," or "synchronous" with regard to primer extension reaction, refers to extending multiple primers or multiple extended primers that are initiated at the same time.

As used herein and in the appended claims, the singular forms "a," "an," and "the" include plural referents unless the context clearly dictates otherwise. Thus, for example, the reference to "a polymerase" refers to one agent or mixtures of such agents, and reference to "the method" includes reference to equivalent steps and/or methods known to those skilled in the art.

Unless defined otherwise, all technical and scientific terms used herein have the same meaning as commonly understood by one of ordinary skill in the art to which this invention belongs. All publications mentioned herein are incorporated herein by reference for the purpose of describing and disclosing devices, compositions, formulations, and methodologies which are described in the publications and which might be used in connection with the presently described invention.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

As used herein, numerous specific details are set forth to provide a more thorough understanding of the present invention. However, it will be apparent to one of skill in the art that the present invention may be practiced without one or more of these specific details.

Although the present invention is described primarily with reference to specific embodiments, it is also envisioned that other embodiments will become apparent to those skilled in the art upon reading the present disclosure, and it is intended that such embodiments be contained within the present inventive methods.

3. DNA Template

In some approaches, a DNA template used in the invention is a DNA concatemer. As used in this context, the term "concatemer," or "DNA concameter," refers to a DNA molecule that contains multiple copies of the same DNA sequences (the "monomer" or "subunit" linked in series). A DNA concatemer may comprise at least two, at least three, at least four, at least 10, at least 25 monomers, at least 50 monomers, at least 200 monomers, or at least 500 monomers. In some approaches, the DNA concatemer comprises 25-1000 monomers, such as 50-800 monomers or 300-600 monomers).

In one embodiment, a monomer of the concatemer comprises one adaptor sequence and one target DNA sequence. Because monomers are linked in series, target DNA sequences will be flanked by two adaptor sequences. In some approaches, the target DNA sequence in the monomer is flanked by two "half-adaptor" sequences, such that each target sequence linked in series in the concatemer is flanked by two adaptors. In some approaches, the monomeric unit comprises one, two, three, or four, or more adaptors. In some approaches, all of the adaptors of a monomer (and concatemer) have the same sequence. On other embodiments, adaptors may have different sequences, such as two, three or four different sequences. It will be recognized that individual monomers may comprise more than one DNA template sequence. Exemplary DNA concatemer structures are described in Table 1 of U.S. Pat. No. 10,227,647.

A DNA concatemer used in the methods described herein may be a DNA nanoball, or "DNB." Without intending to limit the present invention in any fashion, DNA nanoballs are described in Drmanac et al., 2010, Science 327:5961, pp.

78-81, and Drmanac et al. U.S. Pat. No. 8,592,150. The entire content of both references is incorporated herein by reference.

DNA nanoballs (DNBs) are single-stranded copies of a DNA sequence that are concatemerized into a linear DNA structure. Typically, DNBs are produced by copying a single-stranded circular DNA using a strand-displacement polymerase such as phi29 polymerase or Bst polymerase in a process called rolling circle replication. The polymerase begins with extension of a primer that is hybridized to the single-stranded circle and creates a reverse complementary strand that is hybridized to the circle. Once one complete cycle around the circle is made, the polymerase continues extension by displacing the newly made strand ahead of the direction of travel. As the polymerase continues to extend the strand around the circle, multiple reverse complement copies are created, joined in a linear fashion to each other. This strategy creates a target with many probe or primer binding sites resulting in higher signal intensities than obtained with single copy of the circle subunit. These single-stranded DNA concatemers of sufficient length typically form random coils that fill a roughly spherical volume in solution (e.g., SSC buffer at room temperature). In some approaches, DNA nanoballs typically have a diameter of from about 100 to 300 nm. Typically, each monomer comprises at least one target DNA sequence.

DNA concatemers (including DNA nanoballs), can be produced by any suitable method. In one approach, a single genomic fragment is used to generate a single-stranded circular DNA with adaptors interspersed between target sequences that are contiguous or close together in the genome. The circular DNA construct may be amplified enzymatically, e.g., by rolling circle replication, or by ligation of monomers to each other. For illustration and not limitation, DNA nanoballs may be prepared according to the methods described in U.S. Pat. Nos. 8,445,194 and 8,592,150.

Amplification of the DNA by rolling circle replication has several advantages: 1) the amplification is linear, which prevents mutated copies from over-representing the original template sequence, 2) all copies are localized to the one single molecule and so are ideal for microscopic analysis with fluorescent probes or reporters, and 3) replication of the circle can proceed under isothermic conditions allowing easier automation.

The target DNA may be from any source, including naturally occurring sequences (such as genomic DNA, cDNA, mitochondrial DNA, cell free DNA, etc.), artificial sequences (e.g., synthetic sequences, products of gene shuffling or molecular evolution, etc.) or combinations thereof. Target DNA may be derived from sources such as an organism or cell (e.g., from plants, animals, viruses, bacteria, fungi, humans, mammals, insects), forensic sources, etc. Target DNA sequences may be from a population of organisms, such as a population of gut bacteria. A target DNA sequence may be obtained directly from a sample or may be a product of an amplification reaction, a fragmentation reaction, and the like.

A target DNA may have a length within a particular size range, such as 50 to 600 nucleotides in length. Other exemplary size ranges include 25 to 2000, 50 to 1000, 100 to 600, 50-100, 50-300, 100-300, and 100-400 nucleotides in length. In a DNA template polynucleotide having two or more different target DNAs, the target DNAs may be the same length or different lengths. In a library of a DNA template polynucleotide, the members of the library may have, in some approaches, similar lengths (e.g., all in the range of 25 to 2000 nucleotides, or another range).

In one approach, target DNAs may be prepared by fragmenting a larger source DNA (e.g., genomic DNA) to produce fragments in the desired size range. In some approaches, a size-selection step is used to obtain a pool of fragments within a particular size range.

A DNA template described herein may include two or more adaptor sequences. Adaptors may comprise elements for immobilizing DNA template polynucleotides on a substrate, elements for binding oligonucleotides used in sequence determination (e.g., binding sites for primers extended in sequencing by synthesis methods and/or probes for cPAL or other ligation based sequencing methods, and the like), or both elements for immobilization and sequencing. Adaptors may include additional features such as, without limitation, restriction endonuclease recognition sites, extension primer hybridization sites (for use in analysis), bar code sequences, unique molecular identifier sequences, and polymerase recognition sequences.

Adaptor sequences may have a length, structure, and other properties appropriate for a particular sequencing platform and intended use. For example, adaptors may be single-stranded, double-stranded, or partially-double stranded, and may be of a length suitable for the intended use. For example, adaptors may have a length in the range of 10-200 nucleotides, 20-100 nucleotides, 40-100 nucleotides, or 50-80 nucleotides. In some approaches, an adaptor may comprise one or more modified nucleotides that contain modifications to the base, sugar, and/or phosphate moieties.

It will be appreciated by the skilled reader that different members of a library will typically contain common adaptor sequences, although different species or subgenera in the library may have unique features such as sub-genera-specific bar codes.

An individual adaptor sequence may include multiple functionally distinct subsequences. For example, as discussed in detail in this disclosure, a single adaptor sequence may contain two more primer sequences (which can be recognized by different complementary primers or probes). Functionally distinct sequences within an adaptor may be overlapping or non-overlapping. For illustration, given a 40-base long adaptor, in one embodiment, bases 1-20 are a first primer binding site and bases 21-40 are a second primer binding site. In a different embodiment, bases 1-15 are a first primer binding site and bases 21-40 area second primer binding site. In a different embodiment, bases 5-25 are a first primer binding site and bases 15-35 area second primer binding site. Likewise, given a 40-base long adaptor, bases 1-20 can be an immobilization sequence and bases 21-40 can be a primer binding site. Different primer sequences in the same or different adaptors of a DNA template polynucleotide may have the same or different lengths.

Adaptors (e.g., first adaptors, second adaptors, third adaptor, etc.) may comprise one, two or more than two primer binding sequences. A primer binding sequence is defined functionally as the site or sequence to which a primer (or oligonucleotide) specifically binds. For example, an adaptor with two primer binding sequences may be specifically bound by two different primers. In one approach, the two primer binding sequences in the same adaptor are overlapping, i.e., sharing part of the nucleotide sequence. In some approaches, the overlapped region is no more than 50%, or 40%, or 30%, or 20%, or 10% or 5% of either of the two overlapping primer sequences. In one approach, the more than one primer binding sequences are non-overlapping. In some approaches, the non-overlapping primer sequences are immediately adjacent to each other; in some other embodiments, the non-overlapping primer sequences are separated by 1-10, 10-20, 30-40, or 40-50 nucleotides.

It will be apparent that within a given DNA template polynucleotide, different adaptors may have the same sequence or different sequences, and may have the same primer binding sequences, or different primer sequence. Although certain drawings (e.g., FIG. 1) are provided to illustrate the invention, representations of adaptors using similar cross-hatching and the like should not be constructed as indicating the identity of sequences.

4. Primers

Primers used in the methods described herein are of sufficient length to allow hybridization of a primer, with the precise length and sequence dependent on the intended function of the primer (e.g., extension primer, indexing sequence, etc.). Primer sequences are often at least 10, at least 12, at least 15 or at least 18 bases in length. In some embodiments, the primer sequence has a length that ranges from 8 to 60 nucleotides, e.g., from 10 to 25 nucleotides, or from 40 to 60 nucleotides long. It will be well within the ability of one of ordinary skill in the art to select or design primers for use in the present invention.

It will be appreciated that primers and probes may be fully or partially complementary to the primer binding sequence in an adaptor to which it hybridizes. For example, a primer may have at least 85%, 90%, 95%, or 100% identity to the sequence to which it hybridizes.

A primer may also contain additional sequence at the 5' end of the primer that is not complementary to the primer binding sequence in the adaptor. The non-complementary portion of a primer may be at a length that does not interfere with the hybridization between the primer and its primer binding sequence. In general, the non-complementary portion is 1 to 100 nucleotides long. In some embodiments, the non-complementary portion is 4 to 8 nucleotides long. Primers may comprise DNA and/or RNA moieties, and in some approaches primers used in the invention may have also one or more modified nucleotides that contain modifications to the base, sugar, and/or phosphate moieties.

A "sequencing oligonucleotide" or a "sequencing primer" may be an extension primer used in sequencing-by-synthesis reactions (also called "sequencing by extension"). A "sequencing oligonucleotide" may be an oligonucleotide used in a sequencing-by-ligation method such as "combinatorial probe-anchor ligation reaction" (cPAL) (including single, double and multiple cPAL) as described in US Patent Publication 20140213461, incorporated herein by reference for all purposes.

In some cases, the extension primers are also used as sequencing primers, e.g., the first read primers and second read primers. In some cases, the extension primers can also be the products of primer extension reactions, e.g., the first read strands, which can be further extended. First read primers are sequencing primers that are hybridized to the DNA concatemers and extended to generate first reads and form first read strands. As described above, in some cases, the first read strands serve as extension primers and are extended to generate second strands. In some cases, additional extension primers, referred to as MDA primers, are used to hybridize to the DNA concatemers and are extended to generate second strands in the displacement-extension reactions. In some embodiments, the MDA primers and the first read primers have different sequences. In some embodiments, the MDA primers can hybridize to the DNA concatemers upstream of the first read primers, i.e., MDA primer is located 5' to the first read primer. In some embodiments, one or more MDA primers and a first read primer bind to the same adaptor of a monomer of a DNA concatemer, and the one or more MDA primers are located 5' to the first read primer. In some embodiments, the MDA primers comprise random primers. In some embodiments, excess random primers (i.e., random primers that are not hybridized to the DNA concatemers) are removed (e.g., by washing the array) before the MDA is initiated to avoid excess random primers binding to and priming the second strands.

In some cases, primers used in the methods (e.g., first read primers, first read strands, or the MDA primers) could contain excisable nucleotides and these primers can be cleaved at the position of the excisable nucleotides to form new extendable 3-prime ends. Such cleavage results in release of the excisable nucleotides. In some cases, these excisable nucleotides are nucleobases other than any of the A, G, T, or C. Alternatively, or in addition, these excisable nucleotides could be incorporated during the sequencing reaction at desired spacings. The excisable nucleotides are selected for their ability to be excised and removed from the DNA strand to create a 3-prime exposed terminus available for extension. One exemplary excisable nucleotide that can be used in this method is uracil, which can be incorporated in place of thymidine during an extension reaction. When incorporated in a single-stranded DNA, a uracil can be recognized by a uracil-specific excision reagent, for example, USER™. USER™ consists of a mixture of uracil DNA glycosylase (UDG) and DNA glycosylase-lyse endonuclease VIII, which together first catalyzes the excision of uracils forming abasic sites and then breaks the phosphodiester bond of the abasic site, causing breakage in the single-stranded DNA and the release of the uracil. See, Bitinaite et al., USER™ friendly DNA engineering and cloning method by uracil excision, *Nucleic Acids Research*, Vol. 35, Issue 6, 15 Mar. 2007, pp 1992-2002. Primers comprising these excisable nucleotides are first bound to the DNA template, and then cleaved at the positions where the excisable nucleotides appear to allow extension of multiple second strands simultaneously.

In some cases, one or more MDA primers comprise blocking groups at their 3' ends, which prevent them from being extended. The number of the 3' blocked primers can be controlled in order to control the nature and density of independently displaced strands per DNB. In some embodiments, the number of the 3' extendable primers is controlled by maintaining the primers at a suitable concentration during hybridization. In some embodiments, the number of the 3' extendable primers is controlled by mixing the 3' extendable primers and the 3' blocked primers at a suitable ratio.

In some cases, extension primers (i.e., the MDA primers) used in the methods disclosed herein may comprise reversible blocking groups at their 3' ends, and these extension primers are only extended when the blocking groups are removed. In some embodiments, one or more MDA primers bind to the DNA template upstream of first read primers, and after the first reads are generated, the reversible blocking groups of the MDA primers are removed to permit initiation of extension of multiple second strands from the MDA primers. See FIG. 2. In some embodiments, the reversible blocking groups at the 3' of the MDA primers can be removed under conditions that are different from the blocking group added to the first read primer during each cycle of sequencing, such that the blocking group of the MDA primers will remain throughout the first read sequencing. In some embodiments, the reversible blocking groups at the 3' of the MDA primers are different from the blocking groups of the nucleotides added to the first read primer during each cycle of sequencing, such that the blocking group of the MDA primers will remain throughout the first read sequencing. In some cases, the 3' blocking group is a 3' phosphate, which can be removed by a phosphatase.

In methods described in this disclosure, production of second strands is initiated by hybridizing primers comprising sequences that are the reverse complement of the DNA template, e.g., the DNA concatemer. In some cases, the primers hybridize to the adaptor of the monomers of the DNA concatemer. In some cases, second strand synthesis could also be initiated from extending random oligonucleotides, i.e., using MDA primers that have random nucleotide sequences. In this approach a diverse set of primers could be used to hybridize to the arrayed DNA concatemers. In some approaches, these sequences are oligonucleotides of random sequence of 5 to 10 bases, e.g., 6 to 10 bases, or 5 to 8 bases in length. The individual sequences within the random pool will hybridize to complementary sequences within the DNA concatemer.

4.1. Linking of Primers

In some aspects, the primers (e.g., the first read primers, or the MDA primers, or both) used in the methods and compositions disclosed above are linked to form linked pairs. The term "link" refers to both non-covalent and covalent interactions through which the two nucleic acid molecules are brought together. In some cases, the linkage is through DNA hybridization, a chemical bond, or both. These linked pairs of primers can link contiguous or non-contiguous monomers of a DNA concatemer, thereby stabilizing the DNA concatemer.

The primers can be linked via various means. In some embodiments, they are connected via chemical linkage. In some embodiments, two primers are connected via hybridization between two complementary sequences (referred to as "hybridization sequences"), one on each of the primers. In some embodiments, the hybridization sequences are non-palindromic sequences. In some embodiments, the hybridization sequences are palindromic sequences, i.e., a sequence, one half of which is complementary to the other half of the sequence. Methods for linking primers and compositions of linked primers are described in PCT application no. PCT/CN2020/124338, the entire content of which is herein incorporated by reference for all purposes.

The length of hybridization sequences may vary. The length of the hybridization sequence is chosen such that the Tm of the stapler sequence is between 50° C. and 72° C. This ensures that the linked primer pairs can remain hybridized throughout the assay procedure. In some embodiments, the length of the hybridization sequence may range from 20 to 150 nucleotides, e.g., from 40 to 120 nucleotides, from 50 to 100 nucleotides.

In some embodiments, the hybridization sequence is 5' relative to the sequence on the primer that is complementary to the DNA template.

5. Generating First Reads

As described above, in some embodiments, the first read primers serve as sequencing primers and used to determine the sequence of the DNA template, by generating the first reads. The first read primer, in itself, is part of the second strand, and extending the first read primer with nucleotides further generates more of the second strand. Extension with nucleotides can occur such that modifications to the nucleotides only allow for the addition of one nucleotide, followed by detection of the modified nucleotide from the set of A, C, G and T bases to identify the added nucleotide. For example, the one nucleotide that is added may contain a 3'-O-blocking group, for example, a 3'-O-azidomethyl group, in the 3'-OH position of A, C, G, or T. To determine the next base in the series the modified nucleotide is converted to an extendable form to allow the addition of another base in another cycle of sequence determination. In such a sequencing method, the extended first strand primer acts as a primer to each round of nucleotide addition. After the final cycle of nucleotide addition for sequencing, the extended first read primer (also referred to as "the first read strand"), is unblocked and then further extended using a polymerase that may be the same as, or different from, the polymerase used to produce the first read strand. Extension of the first read primer can be carried out by any DNA polymerase, including a polymerase with strand-displacement activity, a polymerase lacking strand-displacement activity, or a mixture of polymerases. In some approaches, the DNA polymerase is one that does not have any or has little strand-displacement activity, for example, the BG9 DNA polymerase.

6. Controlled MDA

In some embodiments, the first read strands are separated from the DNA concatemers a nd removed from the array, and new extension primers are added and extended in MDA. In some embodiments, the 3' blocking groups of the terminal nucleotides of the first read strands (added at the final cycle of first read sequencing) are removed, and these first read strands are used as extension primers in MDA. The MDA method disclosed herein is controlled such that the second strands remain partially hybridized to the DNA concatemer, i.e., the second strands remain bound to the DNA template through a sequence that is hybridized to the DNA template. The second strands also comprise single-stranded branches comprising primer binding sites for second read primers. The second read primers can serve as sequencing primers to generate second reads.

One illustrative example is shown in FIG. 1. First read primers are annealed to a DNA concatemer and extended to generate first reads. The first read sequencing produces first read strands. Controlled MDA is then carried out by extending the first read strands with a polymerase having strand-displacement activity to generate a plurality of second strands. Each second strand comprises a sequence that is hybridized to the concatemer, and an unhybridized, single-stranded branch. Second read primers ① are then hybridized to single-stranded branches of the plurality of second strands and extended to generate the second reads.

6.1. Strand-Displacement DNA Polymerase

The MDA in the methods require DNA polymerases having strand-displacement activities. In one approach, the present invention uses a DNA polymerase with a strong 5'→3' strand-displacement activity. Preferably the polymerase does not have 5'→3' exonuclease activity. However, DNA polymerases having 5'-3' exonuclease activity may be used when the activity does not prevent the implementation of the method of the invention, e.g., by using reaction conditions that inhibit the exonuclease activity. In one approach, the polymerase is Phi29 polymerase. Phi29 polymerase has a strong displacement activity at moderate temperatures (e.g., 20-37° C.). In one approach, Bst DNA Polymerase, Large Fragment (e.g., NEB #MO275, available from New England BioLabs, Ipswich, MA) is used. Bst DNA Polymerase is active at elevated temperatures (~65° C.). In one approach, the polymerase is Deep-VentR DNA polymerase (e.g., NEB #MO258) (Hommelsheim et al., Scientific Reports 4:5052 (2014)).

In addition to the strand-displacement polymerase, other strand displacing mechanisms could be used to assist the strand-displacement, such as helicase enzymes, using strand denaturing agents or reagents that are capable of lowering melting temperatures, commonly referred to as Tm-lowering reagents (e.g., formamide, betaine, proline, 1,2-propanediol and trehalose). The temperature of the reaction could also be adjusted to promote strand melting and aid polymerase extension. In some cases, the temperature could vary in a range from 25° C. to 40° C., for example 28° C. to 35° C., or about 30° C.

Paired-end sequencing in the context of this disclosure requires at least some of the second strands to remain partially hybridized to the DNA template. This allows the sequence reads generated from sequencing the second strands to be paired with the first strand to construct sequence information of the DNA template. That is to say, complete displacement, causing the second strands to dissociate from the first strand, should be avoided or minimized. This can be achieved by controlling progression of the reaction by selecting a polymerase(s) with a suitable polymerization rate or other properties, and by using a variety of reaction parameters including (but not limited to) reaction temperature, duration of the reaction, primer composition, DNA polymerase, primer and nucleotide concentration, additives and buffer composition. Optimal conditions may be determined empirically.

One approach to control the extension-displacement reaction to avoid complete displacement is to use a DNA polymerase having suitable strand-displacement activities to produce the second strands. DNA polymerases such as Phi29, Bst DNA polymerase, Klenow fragment of DNA polymerase I, and Deep-VentR DNA polymerase, are known to have different strength of the strand-displacement activity. See, Kornberg and Baker (1992, DNA Replication, Second Edition, pp. 113-225, Freeman, N.Y.). It is within the ability of one of ordinary skill in the art to select the DNA polymerase suitable for the invention.

In another approach, the extension-displacement reaction is controlled to avoid complete displacement by using suitable concentrations of the DNA polymerase having strand-displacement activity, or suitable concentrations of dNTP, or suitable concentrations of the second primers.

In some embodiments, the extension reaction is controlled by including an agent that affects the duplex formation between extension primers and template DNA, such as DMSO (e.g., 1%-2%), Betaine (e.g., 0.5 M), glycerol (e.g., 10%-20%), Gene 32 Single-stranded DNA binding protein from T4 phage (T4 G32 SSB) (e.g., 10-20 ng/ul), and volume exclusion agents, in the reaction buffer.

The reaction temperatures may also be selected to allow the appropriate speed of polymerization and strand-displacement. Higher temperature typically results in a greater extent of strand-displacement. In some embodiments, reaction temperatures are maintained within the range of 20° C.-37° C., for example, 32° C., 33° C., 34° C., 35° C., 36° C., or 37° C., in order to avoid complete displacement.

In some approaches, extension reactions are controlled by using a mixture of conventional (extendible) primers and non-extendible primers, i.e., 3' end blocked primers. In some embodiments, a non-extendible primer blocks elongation via a chemical blocking group that prevents polymerization by a DNA polymerase. By mixing these two different primers at different ratios, the length of the duplex (hybridized) portion of the newly synthesized complementary DNA strand (follow-on fragments) can be controlled. For example, in one approach a mixture of first primers is used in which 50-70% are non-extendible ("blocked") and 30-50% can be extendible ("unblocked"). Many types of non-extendible primers are known in the art and would be suitable for the present invention.

6.2. Synchronization of Production of Multiple Second Strands

It is desirable to synchronize the extension and displacement of the multiple second strands to avoid the scenario where some strands are partially hybridized while others have been completely displaced, and still others have not been extended far enough. Synchronization can be achieved by various approaches.

6.2.1 Two-Step Second Strand Production

In the approach of two-step second strand production, the second strand can be prepared in two steps. The first reaction step comprises performing MDA in a high concentration of a strand-displacement DNA polymerase, such that there are molecules of DNA polymerases in the reaction that are free. As used herein, "free polymerase," or "free polymerase molecules," refer to, DNA polymerase molecules that are not bound to DNA concatemers on the array and remain in solution. In some embodiments, the DNA polymerase is in a high concentration such that the number of DNA polymerase molecules is greater than the number of the adaptors in the DNA concatemers on the array, such that there are free DNA polymerases that are not bound to the array. Concentrations of the DNA polymerase suitable for this approach can be determined empirically by one of skilled in the art. The first reaction step may last 1-15 minutes, e.g., 1-3 or 2-5 or 3-10 minutes. The second step involves the removal of the reaction components including unbound enzyme and unincorporated nucleotides, and addition of fresh buffer and reaction components except for any DNA polymerase to allow the continued MDA reaction. In these approaches, polymerases with strong association behavior would remain bound to the extending strands, and free polymerase would be removed after the first step incubation. This two-step reaction process minimizes the interaction between the free polymerase and the newly formed second strands and the interaction between the free polymerase and the first strand beyond the initial binding period and facilitates synchronization of extension of the second strand primers by the polymerase. See FIG. 3.

6.2.2. Modified Two-Step Second Strand Production

In the approach of the modified two-step second strand production, after the first read sequencing is completed, a high concentration of polymerase is used to bind to the primers (i.e., the MDA primers or the first read strands) and DNA concatemers under extension-prevention conditions for an initial period. "Extension-prevention conditions" are conditions that favor binding of polymerase to the template than extending the primers by the polymerase. In some embodiments, extension-prevention conditions refers to conditions under which the primer extension cannot proceed. This initial step under the modified two-step second strand production approach maximizes the binding of DNA polymerase to the DNA template and primers. Then the extension-prevention conditions are reversed to permit synchronous extension of the primers.

The extension-prevention condition may be created by removing nucleotides or magnesium from the reaction, by adding inhibitors such as EDTA to the reaction, or both. The concentration of the EDTA may vary in a range of 0.5 mM to 5 mM, for example, 0.8 mM to 4 mM, from 1 mM to 3 mM, or about 1 mM. Thus, in some embodiments the extension-prevention conditions comprise a reaction buffer that is free of individual nucleotides or magnesium, or both, such that the MDA cannot occur. In some embodiment, the extension conditions comprise using primers that are blocked at 3'. The term "free" or "essentially free" refers to that the magnesium concentration or the concentration of nucleotides in the reaction mixture is less than 10%, less than 5%, less than 3%, less than 2%, less than 1% of the concentrations of magnesium or the concentrations of nucleotides required for the extension reaction. A buffer that is free of magnesium is also known as magnesium-free buffer. A buffer that is free of unincorporated nucleotides is also known as nucleotide-free buffer. In some cases, the extension prevention condition comprises a reaction buffer comprising less than 0.2 mM, less than 0.1 mM, less than 0.05 mM, less than 0.02 mM, less than 0.01 mM, or less than 0.005 mM magnesium. In some cases, the concentration of each type of the nucleotides (A, T, C, or G) is less than 0.02 mM, less than 0.01 mM, less than 0.005 mM, or less than 0.001 mM. Reducing the initial reaction temperature could also be used to alter the ratio of the binding events to extension events. Binding could be promoted over extension for an initial period such as 1-5 minutes or 2-10 min. Then the subsequent extension could continue for a further 10-20, 20-30, 30-60 minutes. This two-step process allows synchronization of the production of multiple second strands.

One illustrative embodiment of the methods is shown in FIG. 4. After first reads are obtained by extending first read primers hybridized on the DNA concatemers, the controlled MDA is performed by contacting the array with a strand-displacement DNA polymerase in an extension-prevention condition such that the strand-displacement DNA polymerase binds to the first read strands (and/or MDA primers) but will not extend the first read strands. After the initial period of subjecting the array under the extension-prevention conditions, the extension-prevention conditions are reversed such that first read strands and/or MDA primers are extended synchronously to generate a plurality of second strands 6.2.3. Producing Second Strands Using Modified Primers As described above, using modified first read primers (and/or MDA primers), such as those comprising uracils in place of thymidine, can also promote synchronization of second strand production. In some cases, extending first strand primers in the presence of a nucleotide mixture comprising uracils produces modified first strand primers containing uracils instead of thymidines in various positions. These modified first strand primers or extended first strand primers are then cleaved to allow extension of multiple second strands at the same time.

One illustrative example of this approach is shown in FIG. 5, in which the first read strands produced by extending first read primers comprises excisable nucleotides. The first read primers are the cleaved at the positions of the excisable nucleotides to generate fragments having extendible 3' ends. Each of the fragments are used as primers to generate a plurality of second strands by controlled MDA, each second strand comprising a sequence that is hybridized to one of the plurality of DNA concatemers, and an unhybridized, single-stranded branch. Second read primers ① are then hybridized to the second strands and extended in second read sequencing.

6.2.4. Producing Second Strands Using Additional MDA Primers

In some embodiments, in order to produce a greater number of second strands, additional MDA primers are added to the MDA process. These MDA primers bind to regions of the DNA concatemer that are not in a hybrid structure (single-stranded) and thus can serve as binding sites for added primers. These MDA primers, as well as the first read strands, are extended, together they produce a plurality of second strands. Introducing these MDA primers can increase the production of strand strands and thus increase the amount of sequencing data. In some embodiments, these MDA primers are introduced at the same time when the first read primers are introduced, and the MDA primers are hybridized upstream to the first read primers. See FIG. 2. The MDA primers used in these embodiments typically comprise reversible 3' blocking groups so that it will not extend during the first read sequencing step. After completion of the first read sequencing, the 3' blocking groups are removed from the MDA primers to permit controlled MDA using these MDA primers.

Reversible blocking groups that are suitable for use are known in the art. In some embodiments, a suitable blocking group is one that may be removed by a chemical or enzymatic treatment, and said treatment produces a 3'-OH group. Chemical treatment should not significantly degrade the template or the primer extension strand. Various molecular moieties have been described for the 3' blocking group of reversible terminators such as a 3'-O-allyl group (Ju et al., *Proc. Natl. Acad. Sci. USA* 103: 19635-19640, 2006), 3'-O-azidomethyl-dNTPs (Guo et al., *Proc. Natl Acad. Sci. USA* 105, 9145-9150, 2008), aminoalkoxyl groups (Hutter et al., *Nucleosides, Nucleotides and Nucleic Acids*, 29:879-895, 2010) and the 3'-O-(2-cyanoethyl) group (Knapp et al., *Chem. Eur. J.*, 17, 2903-2915, 2011). Exemplary RT blocking groups include —O-azidomethyl and —O-cyanoethenyl. Non-limiting examples of the reversible blocking groups that can be used are disclosed in PCT/US2018/012425, the relevant portion is herein incorporated by references in its entirety.

In some embodiments, the methods disclosed herein employ one or more of the features described above to improve the efficiency of second strands production and the paired-end sequencing process.

7. Sequence Determination

The sequence of the DNA template can be determined by combining sequence reads generated from sequencing the first strand (the DNA template) and sequence reads generated from sequencing the second strands. As described above, sequencing the first strand may be performed while the first strand primers are extended, i.e., each nucleotide incorporated to the extended first strand primers is identified such that the sequence of the portion of the first strand that is complementary to the extending second strand can be determined. Sequencing the second strand may comprise hybridizing a sequencing oligonucleotide to the sequence in the second strand that is complementary to at least part of the adaptor of the monomer of the DNA concatemer (e.g., "①" in FIG. 1), and determining the nucleotide sequence of the branches of the second strands. In some embodiments, the branches of the second strands are sequenced by extending second read primers. The sequence reads generated from sequencing the second strands are paired with sequence reads generated from sequencing the DNA template to determine the entire target DNA sequence.

It will be appreciated that any of the primers as described above can be used as sequencing oligonucleotides.

Any suitable sequence determination method may be used to determine the sequence of the first and the second strands, for example, SBS, pyrosequencing, sequencing by ligation, and others. In some approaches, more than one sequencing approach is used. For example, the DNA template strand may be sequenced using one method (e.g., SBS) and the second strands are sequenced using a different method (e.g., cPAL). In one approach sequencing is carried out using affinity reagents, e.g., as described in U.S. Pat. No. 10,851, 410, incorporated herein by reference.

In some approaches, the first read sequencing is performed by sequencing by synthesis. In some approaches, the second read sequencing is performed using a plurality of second read primers as a primer for primer extension (e.g., a sequencing by synthesis reaction), or is an extension product of such a primer, or is an oligonucleotide capable of acting as an anchor for sequencing by ligation, or is an ligation product of such an oligonucleotide and a labeled probe (e.g., a labeled cPAL probe). In one approach the second primer comprises a portion complementary to the adaptor sequence and can be extended for sequencing the second strand.

SBS may rely on DNA polymerase activity to perform chain extension during the sequencing reaction step. SBS is well known in the art. See, e.g., U.S. Pat. Nos. 6,787,308 and 8,241,57362. Sequencing on DNA nanoballs can occur through a variety of processes. In one approach the circle used to generate the DNB is prepared with a DNA region of known sequence (the adapter) and an adjacent sequence of unknown identity which is to be determined. The adapter provides a primer hybridization site such that extension of the primer will lead to addition of nucleotides into the "unknown" or "to be determined" region if a polymerase is used for the extension. The nucleotides, if reversibly blocked at the 3' position, are added one position at a time and are complementary to the base position in the DNB. After removal of the 3' blocking group an additional position can be read in the next cycle. A fluorescent moiety characteristic of the base type is used for detection of the incorporating base and so reveals the base at that position in the DNB.

Alternatively, sequencing by ligation can be used. The primer or anchor can be extended by ligating fluorescent oligonucleotides that extend into the unknown sequence. In this sequencing method fluorescent oligonucleotides with degenerate bases are ligated to the initiating anchor, however one base of the oligonucleotide is defined, and is associated with the fluorescent moiety. Ligation of the oligo probe to the anchor created a stable fluorescence after washing excess probes and is dependent upon the recognition of the defined base being complementary to the base at the same position of the DNB. Sequencing by ligation is described in, for example, Shendure et al., 2005, Science, 309: 1728-1739.)

Other sequencing methods can also be used, e.g., pyrosequencing (See, e.g., Ronaghi et al., Anal. Biochem. (1996) 242:84-89) and sequencing by hybridization (see, e.g., Drmanac et al, Advances in Biochemical Engineering/Biotechnology (2002) 77: 75-101.

It will be apparent to the reader that variations of the specific embodiments outlined herein may be used. In one approach, the extension primers (e.g., the first stand primer) and sequencing oligonucleotides (e.g., the second strand oligonucleotide) bind to different portions of an adaptor sequence. In one approach, the extension primers and sequencing oligonucleotides bind to the same portion of the adaptor sequence (e.g., a portion of the adaptor sequence for extension and the complement of same portion of the adaptor sequence for sequencing).

8. Substrates and Compartments

In some applications, DNA template polynucleotides are immobilized on a substrate. Generally, the immobilization occurs before the synthesis of the second strands discussed above. Exemplary substrates may be substantially planar (e.g., slides, wells, flow cells) or nonplanar and unitary or formed from a plurality of distinct units (e.g., beads). Exemplary materials include glass, ceramic, silica, silicon, metal, elastomer (e.g., silicone), polyacrylamide (e.g., a polyacrylamide hydrogel; see WO 2005/065814). In some approaches, the substrate comprises an ordered or non-ordered array of immobilization sites or wells. In some approaches, target DNA polynucleotides are immobilized on a substantially planar substrate, such as a substrate comprising an ordered or non-ordered array of immobilization sites or wells. In some approaches, target DNA polynucleotides are immobilized on beads.

Polynucleotides can be immobilized on a substrate by a variety of techniques, including covalent and non-covalent attachment. Polynucleotides can be fixed to a substrate by a variety of techniques. In one embodiment, a surface may include capture probes that form complexes, e.g., double stranded duplexes, with component of the polynucleotide molecule, such as an adaptor oligonucleotide. In another embodiment, a surface may have reactive functionalities that react with complementary functionalities on the polynucleotide molecules to form a covalent linkage. DNA molecules may also be efficiently attached to hydrophobic surfaces, such as a clean glass surface that has a low concentration of various reactive functionalities, such as —OH groups. In still another embodiment, polynucleotide molecules can be adsorbed to a surface through non-specific interactions with the surface, or through non-covalent interactions such as hydrogen bonding, van der Waals forces, and the like.

For example, a DNA nanoball may be immobilized to a discrete spaced apart region as described in U.S. Pat. No. 8,609,335. In one approach, the DNBs are immobilized on a substrate by hybridization to immobilized probe sequences, and solid-phase nucleic acid amplification methods are used to produce clonal clusters comprising DNA template polynucleotides. See, e.g., WO 98/44151 and WO 00/18957.

In some approaches, DNA template polynucleotides are compartmentalized in an emulsion, droplets, on beads and/or in microwells (Margulies et al. "Genome sequencing in microfabricated high-density picolitre reactors." Nature 437:7057 (2005); Shendure et al. "Accurate multiplex polony sequencing of an evolved bacterial genome" Science 309, 1728-1732 (2005) before the primer extension steps.

Typically, DNA nanoballs are arrayed on a substrate in either an ordered or random array. In many applications the adsorption to the substrate is mediated through substrate-protein-DNA interactions. In addition, to achieve stable nanoball arrays through cycles of sequencing, post attachment deposition of a protein layer can improve stability of the DNA array, see WO2013066975A1, the entire disclosure of which is herein incorporated by reference.

9. Kits

In some aspects, the method of producing second strands for sequencing a DNA template can be performed using a kit. The kit may comprise one or more DNA polymerases comprising a strand-displacement DNA polymerase, a mixture of nucleotides including A, C, T, G, and primers. The kit may further comprise a non-displacement DNA polymerase and reversibly terminated dNTPs that can be used in sequencing by synthesis. The kit may further comprise a buffer that is free of magnesium ("magnesium-free buffer"). The kit may further comprise an extension inhibitor (e.g., EDTA, excess salts including KCl and NaCl, ionic detergents such as sodium deocycholate, sarkosyl and SDS, ethanol and isopropanol). In some embodiments, the mixture of nucleotides may further comprise uracil. In some embodiments, the ratio of uracil to the thymidine in the mixture is in the range of 1:2 to 1:10, e.g., 1:3 to 1:8, or 1:4 to 1:5. In some embodiments, the kit may further comprise a mixture of primers that are blocked at 3' (i.e., 3' blocked primers) and primers that are not blocked. In some embodiments, the ratio of the blocked primer to the unblocked primer is in the range of 1:1 to 1:5, e.g., from 1:2 to 1:4.

10. Arrays of DNA Complexes

In one aspect the invention comprises an array of DNA complexes. In one aspect, the array is a support comprising an array of discrete areas, wherein a plurality of the areas comprise a clonal cluster of single-stranded DNA template and a plurality of primers. In some embodiments, the DNA template is a single-stranded concatemer comprising a plurality of monomers, each monomer comprising an adaptor sequence and a DNA target sequence. Each of the plurality of primers comprises a primer sequence that is complementary to and hybridizes to an adaptor sequence of the DNA template. In some embodiments, each of some of the plurality of the primers comprises exercisable nucleotides, and the primer can be cleaved at the positions where the exercisable nucleotides are present to generate two or more fragments having extendible 3' ends.

In another aspect, the array is a support comprising an array of discrete areas, wherein a plurality of the areas comprise a clonal cluster of single-stranded DNA concatemers, a plurality of primers having reversible 3' blocking groups, and a plurality of primers having extendible 3' ends. The single-stranded concatemer comprises a plurality of monomers, and each monomer comprises an adaptor sequence and a DNA target sequence. Each primer comprises a primer sequence that is complementary to and hybridizes to an adaptor sequence of the DNA template, and at least one adaptor is hybridized to one primer having a reversible 3' blocking group and one primer having an extendible 3' end, and the primer having a reversible 3' blocking group is upstream of the primer having an extendible 3' end.

In one aspect, disclosed herein is a reaction mixture comprising an array of discrete areas, wherein a plurality of the areas comprise a clonal cluster of single-stranded DNA concatemers, a plurality of primers, and a DNA polymerase. The single-stranded concatemer comprises a plurality of monomers, and each monomer comprises an adaptor sequence and a DNA target sequence. Each primer comprises a primer sequence that is complementary to and hybridizes to an adaptor sequence of the DNA template. The array is in a reaction mixture that is in extension-prevention conditions such that the DNA polymerase bind to the DNA template but cannot extend the primers. In some embodiments, the extension-prevention conditions are that the reaction mixture comprises an extension inhibitor (e.g., EDTA, salts including KCl and NaCl, ionic detergents such as sodium deocycholate, sarkosyl and SDS, ethanol and isopropanol), a buffer that lacks magnesium, or both.

It will be appreciated that the DNA complexes of the array may comprise any of the properties of complexes described herein or made according to methods described herein. Additionally, the complexes may have any combination of one or more of the following features: (i) the array comprises at least $10^6$ discrete areas, (ii) wherein the DNAs are single-stranded (iii) wherein the second primer comprises at least 10 bases of sequence of the adaptor, preferably at least 12 bases, and optionally at least 15 bases, and (iv) the second primer is completely complementary to the second DNA strand to which it is hybridized.

11. Embodiments

The following are the exemplary embodiments of the methods and compositions disclosed in this application.

Embodiment 1. A paired-end sequencing method comprising:
(a) providing a DNA array comprising a surface with at least 1,000 DNA concatemers immobilized thereon,
(b) for each of a plurality of DNA concatemers on the array,
(i) annealing first read primers to primer binding sites on the DNA concatemer,
(ii) extending at least some of the first read primers to incorporate dNTPs or dNTP analogs, thereby producing first read strands, wherein each of the dNTPs or dNTP analogs being incorporated is identified to produce first reads,
(c) performing controlled MDA by extending at least some of the first read strands with a polymerase having strand-displacement activity to generate a plurality of second strands, each second strand comprising a portion that is hybridized to the DNA concatemer, and an unhybridized, single-stranded branch; and
(d) annealing second read primers to the single-stranded branches of the plurality of second strands,
(e) extending the second read primers to generate the second reads.

Embodiment 2. The method of embodiment 1, wherein the DNA concatemer comprises a plurality of monomers, each monomer comprising an adaptor and a target sequence.

Embodiment 3. The method of embodiment 2, wherein the first read primers are hybridized to the adaptor of each monomer of the DNA concatemer.

Embodiment 4. The method of any one of embodiments 1-3, wherein the first read strands produced in step (a) comprise 3' blocking groups, which prevent the first read strands from being further extended, and wherein 3' block groups from the first read strands are removed before performing the controlled MDA in step (b).

Embodiment 5. The method of any one of embodiments 1-4, wherein a plurality of MDA primers are hybridized to the DNA concatemer before step (b)(ii),
wherein the MDA primers comprise reversible blocking groups to prevent extension of the MDA primers, and said reversible blocking groups are removed after step (b) (ii) but before step (c), and
wherein step (c) comprises extending the plurality of MDA primers and the first read strands.

Embodiment 6. The method of embodiment 5, wherein the plurality of MDA primers comprise random primers.

Embodiment 7. The method of embodiment 5 or 6, wherein the DNA concatemer comprises an adaptor that is hybridized to at least one MDA primer and at least one first read primer, and
wherein the at least one MDA primer is upstream of the at least one first read primer.

Embodiment 8. The method of any one of embodiments 5-7, wherein the MDA primer has a length that ranges from 5-10 nucleotide.

Embodiment 9. The method of any one of the preceding embodiments, wherein the controlled MDA in the step (c) comprises
(i) performing MDA for a first period in the presence of a concentration of strand-displacement DNA polymerase such that excess molecules of DNA polymerase are not bound to the first read strands, and,
(ii) removing the excess molecules of the strand-displacement DNA polymerase from the array at the end of the first period and continuing the MDA to generate the second strands, each comprising the portion that is hybridized to the at least one DNA concatemer, and the unhybridized, single-stranded branch.

Embodiment 10. The method of embodiment 9, wherein removing the excess molecules of the strand-displacement DNA polymerase is performed by washing the array, and wherein the step (ii) comprises washing the array and adding fresh buffer comprising unincorporated nucleotides but no DNA polymerase.

Embodiment 11. The method of embodiment 9 or 10, wherein the ratio of the length of the first period to the length of a period of completing the controlled MDA in step (c) ranges from 1:30 to 1:2.

Embodiment 12. The method of any one of embodiments 9-11, wherein the period for completing the controlled MDA in the step (c) is 10-90 minutes.

Embodiment 13. The method of any one of embodiments 9-12, wherein the first period is 1-10 minutes.

Embodiment 14. The method of any one of embodiments 1-13, wherein step (c) performing controlled MDA comprises:
(i) contacting the array with the strand-displacement DNA polymerase under an extension prevention condition, and then
(ii) reversing the extension prevention condition such that first read strands are extended simultaneously to generate a plurality of the second strands, each comprising the portion that is hybridized to the at least one DNA concatemer, and the unhybridized, single-stranded branch.

Embodiment 15. The method of embodiment 14, wherein the extension prevention condition is a reaction buffer that is free of magnesium or unincorporated nucleotides.

Embodiment 16. The method of embodiment 14, wherein the extension prevention condition is a reaction buffer containing a polymerization inhibitor.

Embodiment 17. The method of embodiment 16, wherein the polymerization inhibitor is EDTA.

Embodiment 18. The method of embodiment 14, wherein the extension-prevention condition is a temperature that is less than 20° C.

Embodiment 19. The method of embodiment 14, wherein the strand-displacement DNA polymerase in (i) is at a concentration such that excess molecules of DNA polymerase are not bound to the first read primers, wherein the method further comprises removing unbound molecules of the strand-displacement DNA polymerases from the array between step (i) and step (ii).

Embodiment 20. The method of embodiment 14, wherein the strand-displacement DNA polymerase in (i) is at a concentration such that excess molecules of DNA polymerase are not bound to the first read primers, wherein step (ii) comprises extending the first read strands for a first period, and removing the excess molecules of the strand-displacement DNA polymerase from the array at the end of the first period, and
continuing MDA in a reaction containing no excess molecules of DNA polymerase.

Embodiment 21. The method of embodiment 20, wherein the ratio of the first period to the period of completing the controlled MDA in step (c) ranges from 1:30 to 1:2.

Embodiment 22. The method of embodiment 20 or 21, wherein the period of completing the MDA in the step (c) is 10-90 minutes.

Embodiment 23. The method of any one of embodiments 20-22, wherein the first period is 1-10 minutes.

Embodiment 24. A paired-end sequencing method comprising:
(a) extending first read primers hybridized to a plurality of single-stranded DNA concatemers immobilized on an array in the presence of excisable nucleotides to generate first reads of the plurality of single-stranded DNA concatemers, wherein said extending produces first read strands incorporating the exercisable nucleotides;
(b) cleaving the first read strands where the exercisable bases are present to produce fragments of first read strands having extendible 3' ends,
(c) performing controlled MDA by extending the fragments of the first read strands to generate a plurality of second strands, and wherein the controlled MDA resulted in a plurality of second strands, each comprising a sequence that is hybridized to one of the plurality of single-stranded DNA concatemers, and an unhybridized, single-stranded branch; and
(d) extending second read primers that are hybridized to single-stranded branches of the plurality of second strands to generate the second reads.

Embodiment 25. The method of embodiment 24, wherein the excisable nucleotides are uracils.

Embodiment 26. A paired-end sequencing method comprising:
(a) extending first read primers hybridized on a plurality of single strand DNA concatemers immobilized on an array to generate first reads of the plurality of single strand DNA, wherein said extending produced first read strands;
(b) removing the first read strands;
(c) performing controlled MDA by extending a plurality of MDA primers that are hybridized to the DNA concameters with a polymerase having strand-displacement activity to generate a plurality of second strands, each comprising a sequence that is hybridized to one of the plurality of single strand DNA concatemers, and an unhybridized, single-stranded branch; and
(d) extending second read primers that are hybridized to single-stranded branches of the plurality of second strands to generate the second reads.

Embodiment 27. The method of embodiment 26, wherein the plurality of MDA primers comprise random primers.

Embodiment 28. The method of any one of embodiments 1-27, wherein the extending the first read primers in step (a) and extending the first read strands in the step (b) are performed by using a single DNA polymerases.

Embodiment 29. The method of any one of embodiments 1-27, wherein the extending the first strand primers in step (a) and extending the first read strands in the step (b) are performed by using different DNA polymerases.

Embodiment 30. The method of any one of embodiments 1-27, wherein extending the first strand primers in step (a) is by a non-displacement DNA polymerase.

Embodiment 31. The method of any one of embodiments 1-30, wherein the first reads are determined by sequencing by synthesis.

Embodiment 32. The method of any one of embodiments 1-31, wherein extending of the first read primers lasts a period of 1-15 minutes.

Embodiment 33. The method of any of the embodiments above, further comprising combining the first reads and the second reads to determine the sequence of the target DNA sequence.

Embodiment 34. An array comprising a plurality of single-stranded DNA concatemers and a plurality of primers,
wherein each single-stranded concatemer comprises a plurality of monomers,
wherein each monomer comprises an adaptor sequence and a DNA target sequence,
wherein each primer comprises a primer sequence that is complementary to and hybridizes to an adaptor sequence of the DNA concatemer,
wherein at least one primer comprises excisable nucleotides, and
wherein the at least one primer can be cleaved to release the excisable nucleotides and produces two or more fragments having extendible 3' ends.

Embodiment 35. A kit comprising
a plurality of sequencing primers,
a DNA polymerase without strand-displacement activity,
a mixture of reversibly terminated nucleotides for SBS,
a strand-displacement DNA polymerase, and
a mixture of dNTPs.

Embodiment 36. The kit of embodiment 35, wherein the mixture of reversibly terminated nucleotides. uracil, and the kit further comprises a cleaving agent that is capable of removing a uracil from a DNA strand.

Embodiment 37. The kit of embodiment 35 or 36, wherein the kit further comprises a magnesium-free buffer.

All publications and patent documents cited herein are incorporated herein by reference as if each such publication or document was specifically and individually indicated to be incorporated herein by reference. Although the present invention is described primarily with reference to specific embodiments, it is also envisioned that other embodiments will become apparent to those skilled in the art upon reading the present disclosure, and it is intended that such embodiments be contained within the present inventive methods.

We claim:

1. A paired-end sequencing method comprising:
   (a) providing a DNA array comprising a surface with at least 1,000 DNA concatemers immobilized thereon,
   (b) for each of a plurality of DNA concatemers on the array,
   (i) annealing first read primers to primer binding sites on the DNA concatemer,
   (ii) extending at least some of the first read primers to incorporate dNTPs or dNTP analogs, thereby producing first read strands, wherein each of the dNTPs or dNTP analogs being incorporated is identified to produce first reads,
   (c) performing controlled MDA by
   (i) extending at least some of the first read strands with a polymerase having strand-displacement activity to generate a plurality of second strands, each second strand comprising a portion that is hybridized to the DNA concatemer, and an unhybridized, single-stranded branch, or
   (ii) removing the first read strands and extending a plurality of MDA primers that are hybridized to the DNA concameters with a polymerase having strand-displacement activity to generate a plurality of second strands, each comprising a sequence that is hybridized to one of the plurality of single strand DNA concatemers, and an unhybridized, single-stranded branch; and
   (d) annealing second read primers to the single-stranded branches of the plurality of second strands,
   (e) extending the second read primers to generate the second reads.

2. The method of claim 1, wherein the DNA concatemer comprises a plurality of monomers, each monomer comprising an adaptor and a target sequence.

3. The method of claim 2, wherein the first read primers are hybridized to the adaptor of each monomer of the DNA concatemer.

4. The method of claim 1, wherein the first read strands produced in step (a) comprise 3' blocking groups, which prevent the first read strands from being further extended, and wherein 3' block groups from the first read strands are removed before performing the controlled MDA in step (b).

5. The method of claim 1, wherein a plurality of MDA primers are hybridized to the DNA concatemer before step (b) (ii),
wherein the MDA primers comprise reversible blocking groups to prevent extension of the MDA primers, and said reversible blocking groups are removed after step (b) (ii) but before step (c), and
wherein step (c) comprises extending the plurality of MDA primers and the first read strands.

6. The method of claim 5, wherein the plurality of MDA primers comprise random primers.

7. The method of claim 5, wherein the DNA concatemer comprises an adaptor that is hybridized to at least one MDA primer and at least one first read primer, and wherein the at least one MDA primer is upstream of the at least one first read primer.

8. The method of claim 5, wherein the MDA primer has a length that ranges from 5-10 nucleotide.

9. The method of claim 1, wherein the controlled MDA in the step (c) comprises
   (i) performing MDA for a first period in the presence of an excess amount of strand-displacement DNA polymerase, wherein the excess amount of the strand-displacement DNA polymerase is not bound to the first read strands, and, (ii) removing the excess amount of the strand-displacement DNA polymerase from the array at the end of the first period and continuing the MDA to generate the second strands, each comprising the portion that is hybridized to the at least one DNA concatemer, and the unhybridized, single-stranded branch.

10. The method of claim 9, wherein removing the excess amount of the strand-displacement DNA polymerase is performed by washing the array, and wherein the step (ii) comprises washing the array and adding fresh buffer comprising unincorporated nucleotides but no DNA polymerase.

11. The method of claim 9, wherein the ratio of the length of the first period to the length of a period of completing the controlled MDA in step (c) ranges from 1:30 to 1:2.

12. The method of claim 9, wherein the period for completing the controlled MDA in the step (c) is 10-90 minutes.

13. The method of claim 9, wherein the first period is 1-10 minutes.

14. The method of claim 1, wherein step (c) performing controlled MDA comprises:
   (i) contacting the array with the strand-displacement DNA polymerase under an extension prevention condition, and then
   (ii) reversing the extension prevention condition such that first read strands are extended simultaneously to generate a plurality of the second strands, each comprising the portion that is hybridized to the at least one DNA concatemer, and the unhybridized, single-stranded branch.

15. The method of claim 14, wherein the extension prevention condition is a reaction buffer that is free of magnesium or unincorporated nucleotides.

16. The method of claim 14, wherein the extension prevention condition is a reaction buffer containing a polymerization inhibitor.

17. The method of claim 16, wherein the polymerization inhibitor is EDTA.

18. The method of claim 14, wherein the extension-prevention condition is a temperature that is less than 20° C.

19. The method of claim 14, wherein the strand-displacement DNA polymerase in (i) is in an excess amount such that excess molecules amount of DNA polymerase are not bound to the first read primers, wherein the method further comprises removing unbound strand-displacement DNA polymerases from the array between step (1) and step (11).

20. The method of claim 14, wherein the strand-displacement DNA polymerase in (i) is in an excess amount such that excess amount of DNA polymerase are not bound to the first read primers, wherein step 11 comprises extending the first read strands for a first period, and removing the excess amount of the strand-displacement DNA polymerase from the array at the end of the first period, and continuing MDA in a reaction containing no excess molecules-amount of DNA polymerase.

21. The method of claim 20, wherein the ratio of the first period to the period of completing the controlled MDA in step (c) ranges from 1:30 to 1:2.

22. The method of claim 1, wherein the extending the first read primers in step (b) and extending the first read strands in the step (c) are performed by using a single DNA polymerase or by using different DNA polymerases.

23. The method of claim 1, wherein extending the first read primers in step (b) is by a non-displacement DNA polymerase.

24. The method of claim 1, wherein the first reads are determined by sequencing by synthesis.

25. The method of claim 1, wherein extending of the first read primers lasts a period of 1-15 minutes.

26. The method of claim 1, further comprising combining the first reads and the second reads to determine the sequence of the target DNA sequence.

* * * * *